M. C. HARRIS.
ANTISKIDDING DEVICE FOR TIRES.
APPLICATION FILED MAY 22, 1912.
1,053,504. Patented Feb. 18, 1913.
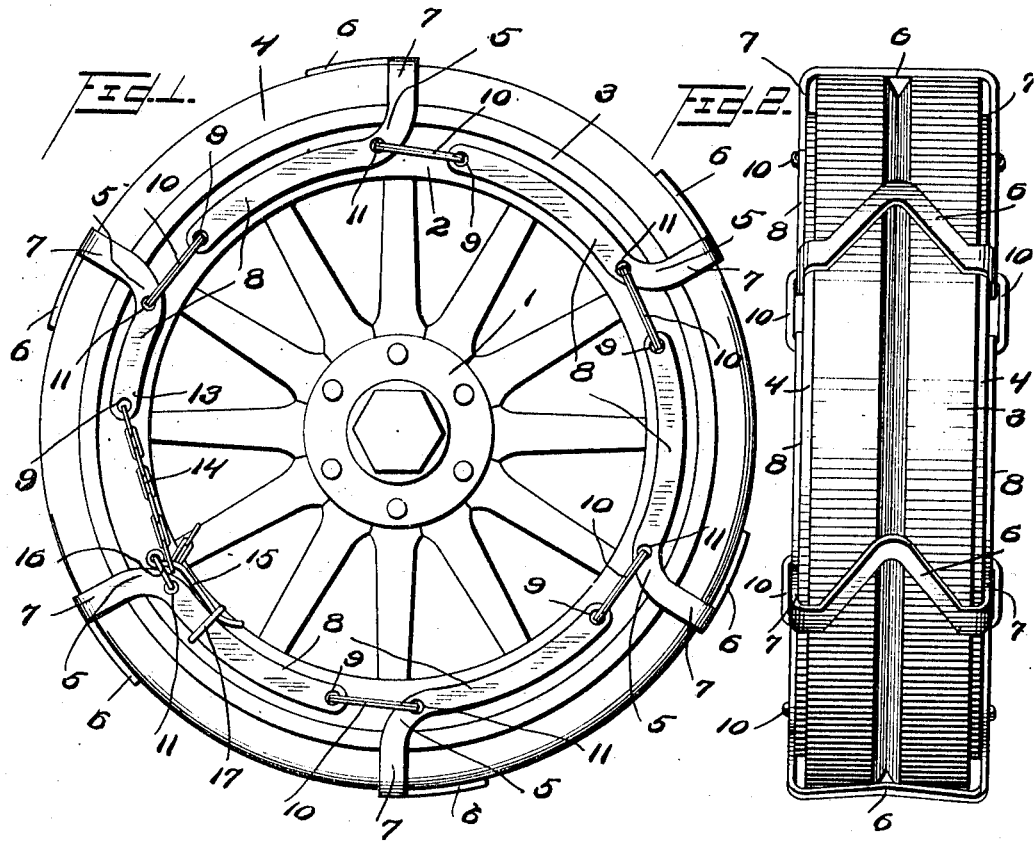
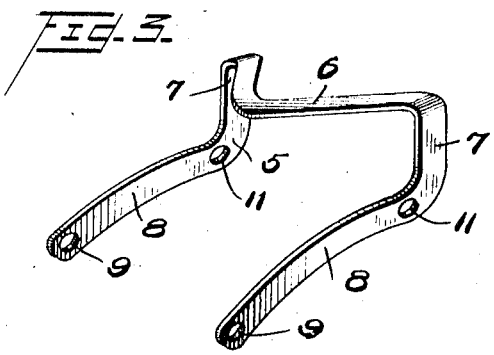
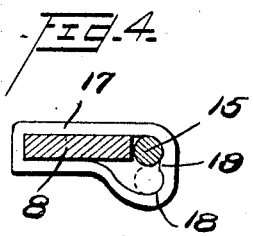
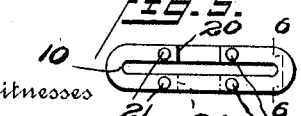
Inventor
Michael C. Harris
By Joshua R. H. Potts
Attorney
Witnesses

UNITED STATES PATENT OFFICE.

MICHAEL C. HARRIS, OF PHILADELPHIA, PENNSYLVANIA.

ANTISKIDDING DEVICE FOR TIRES.

1,053,504. Specification of Letters Patent. Patented Feb. 18, 1913.

Application filed May 22, 1912. Serial No. 698,949.

*To all whom it may concern:*

Be it known that I, MICHAEL C. HARRIS, a citizen of the United States, residing at Philadelphia, in the county of Philadelphia and State of Pennsylvania, have invented certain new and useful Improvements in Antiskidding Devices for Tires, of which the following is a specification.

My invention relates to improvements in antiskidding devices for tires, the object of the invention being to provide an improved attachment of this character which may be readily placed in position on a tire, and removed therefrom, and which is especially designed for use in connection with solid tires upon heavy trucks and drays, yet which is adapted for use in connection with any form of tire.

A further object is to provide an improved circular series of levers having intermediate ground contacting portions of general V-shape which insure a gripping action as the wheel revolves, and which prevent skidding, and so connect the several levers that the pressure on one acts to bind the others, and insure a firm hold on the tire.

With these and other objects in view, the invention consists in certain novel features of construction and combinations and arrangements of parts, as will be more fully hereinafter described and pointed out in the claim.

In the accompanying drawings: Figure 1, is a view in side elevation illustrating my improvements in position on a wheel. Fig. 2, is an edge view of Fig. 1. Fig. 3, is a perspective view of one of the levers. Fig. 4, is an enlarged view in cross section illustrating the manner of locking the clamping lever. Fig. 5, is a view in side elevation on an enlarged scale of one of the lever connecting links, and Fig. 6, is a view in section on the line 6—6 of Fig. 5.

1 represents a wheel, 2 the felly thereon, and 3 the rim on which a rubber tire 4 is located. The particular tire indicated is of the heavy solid rubber type, designed primarily for use in connection with heavy drays and trucks, and this form of tire has a flat grooved periphery as clearly shown in Fig. 2.

Around the tire, I locate my improved anti-skidding device which comprises a circular series of levers 5. One of these levers is shown in perspective in Fig. 3, where it will be seen that each lever comprises a strip of sheet metal which is bent intermediate its ends forming a flat V-shaped ground engaging portion 6. The ends of the strip then extend beside the tire and felly in a radial direction as shown at 7, and then curve substantially concentric with the curvature of the wheel. These curved portions, for purposes of description I shall term arms 8, and these arms at their free ends are provided with openings 9 for the reception of links 10 connecting said rear ends with the adjacent levers at the forward ends of the latter where said levers are provided with openings 11. In other words, the parallel arms at the sides of the wheel are provided with two openings 9 and 11, so that the said levers may be connected with adjacent levers by the links 10. The arms of one of the levers is preferably shorter as shown at 13, and these shorter arms are connected by chains 14 with locking levers 15 on the adjacent lever 5. By this arrangement the ground contacting V-shaped portions 6 of all of the levers are arranged an approximate equi-distance apart, yet the flexible chains 14 allow of a predetermined amount of adjustment in order to securely clamp the device upon various sizes of wheel.

The levers 15 above referred to are connected by links 16 with their lever 5, and for purposes of distinguishing these locking levers from the other levers, I shall term the first-mentioned levers ground engaging levers. The locking levers are projected through links of chains 14, and are then fulcrumed with their free ends pressed toward the ground engaging lever 5. Links 17, as shown most clearly in Fig. 4, are provided on the arms 8 of the ground engaging lever 5 with which locking levers 15 are connected, and it will be seen that these links 17 have a lateral off-set portion 18 which may be readily slid onto the locking levers 15, when the latter are at one side of the arms 8. When the locking levers are thus positioned, they may be forced laterally over lugs 19 in link 17, and positioned between the edge of the arms 8 and the ends of the links, and securely held against accidental movement. The pressure applied to the anti-skidding device by the locking levers 15 is determined by the links of chains 14 through which levers 15 are projected.

By reference to Fig. 3, it will be seen that the V-shaped ground engaging portion of the ground engaging levers 5 extends rearwardly in a direction of the free ends of the arms 8, hence when these ground engaging portions 6 are forced upwardly by reason of the weight of the vehicle thereon, the levers or arms 8 are caused to fulcrum moving their free ends inwardly. This movement tends to draw inwardly the ground engaging portions of all of the levers, so that the tire is firmly gripped and there is no possibility of the attachment slipping on the tire. Furthermore, the V-shaped ground engaging portions of the links grip the ground, so that the wheel does not slip but readily propels the vehicle, and the angular formation of these ground engaging portions prevent any sidewise slipping or skidding movement.

The device may be quickly attached and detached as above described by moving the links 17 and locking levers 15.

The links 10, as shown most clearly in Figs. 5 and 6, each comprise two sheet metal blanks open at one side, as shown at 20, and these links are oppositely positioned and secured together by rivets 21. This enables the links to be assembled on the levers and readily secured by the links.

To prevent any lateral movement of the link members relative to each other, said links have their engaging faces at their ends formed with interlocking lugs and recesses 22, as seen most clearly in Fig. 6, and this engagement prevents any possibility of shearing the rivets and insures a strong durable structure.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

An anti-skidding device, comprising a circular series of levers, each lever projected rearwardly between its ends in general V-shape, the ends of each lever extending beside both tires radially for a relatively short distance, and then curving rearwardly concentrically with the axis of the wheel, and links pivotally connecting the ends of said levers at the sides of the tire, substantially as described.

In testimony whereof I have signed my name to this specification in the presence of two subscribing witnesses.

MICHAEL C. HARRIS.

Witnesses:
CHAS. E. POTTS,
R. H. KRENKEL.